(12) United States Patent
Sato

(10) Patent No.: US 7,718,723 B2
(45) Date of Patent: May 18, 2010

(54) CURABLE FLUOROPOLYETHER RUBBER COMPOSITIONS AND RUBBER ARTICLES

(75) Inventor: Shinichi Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1018 days.

(21) Appl. No.: 11/407,139

(22) Filed: Apr. 20, 2006

(65) Prior Publication Data

US 2006/0241223 A1 Oct. 26, 2006

(30) Foreign Application Priority Data

Apr. 21, 2005 (JP) ............................ 2005-123838

(51) Int. Cl.
*B60C 1/00* (2006.01)
(52) U.S. Cl. ................. 524/261; 524/544; 524/588; 524/730; 525/326.2
(58) Field of Classification Search ................. 524/261, 524/544, 588, 730, 326.2
See application file for complete search history.

(56) References Cited

U.S. PATENT DOCUMENTS

| | | | | |
|---|---|---|---|---|
| 4,797,462 A | * | 1/1989 | Letoffe et al. | 528/12 |
| 5,358,996 A | * | 10/1994 | Takago et al. | 524/588 |
| 5,656,711 A | * | 8/1997 | Fukuda et al. | 528/15 |
| 5,665,846 A | | 9/1997 | Sato et al. | |
| 5,919,886 A | * | 7/1999 | Matsuda et al. | 528/42 |
| 6,075,112 A | * | 6/2000 | Irie et al. | 528/15 |
| 6,417,311 B1 | * | 7/2002 | Fukuda et al. | 528/42 |
| 6,517,946 B2 | * | 2/2003 | Shiono et al. | 428/450 |
| 6,582,804 B2 | * | 6/2003 | Wu et al. | 428/195.1 |
| 2001/0008914 A1 | | 7/2001 | Osawa et al. | |

FOREIGN PATENT DOCUMENTS

| | | |
|---|---|---|
| EP | 0 967 251 A1 | 12/1999 |
| EP | 1 422 260 A2 | 5/2004 |
| EP | 1715005 A1 * | 10/2006 |
| JP | 2990646 B2 | 10/1999 |
| JP | 2003-292761 * | 10/2003 |
| JP | 2003-292761 A | 10/2003 |

* cited by examiner

*Primary Examiner*—Peter D. Mulcahy
*Assistant Examiner*—Henry Hu
(74) *Attorney, Agent, or Firm*—Birch, Stewart, Kolasch & Birch, LLP

(57) ABSTRACT

A curable fluoropolyether rubber composition comprising (A) a straight-chain fluoropolyether compound having at least two alkenyl groups and a perfluoropolyether structure, (B) an organosilicon compound having at least two SiH groups, (C) an organosilicon compound having a silanol group and a melting point of at least 60° C., and (D) a hydrosilylation catalyst has advantages of little viscosity buildup and improved mold release and cures into a product that exhibits heat resistance, chemical resistance, water repellency, and oil repellency.

2 Claims, No Drawings

CURABLE FLUOROPOLYETHER RUBBER COMPOSITIONS AND RUBBER ARTICLES

CROSS-REFERENCE TO RELATED APPLICATION

This non-provisional application claims priority under 35 U.S.C.§119(a) on Patent Application No. 2005-123838 filed in Japan on Apr. 21, 2005, the entire contents of which are hereby incorporated by reference.

This invention relates to curable fluoropolyether rubber compositions which cure into rubber products having good solvent resistance, chemical resistance, weather resistance, parting property, water repellency, oil repellency and heat resistance as well as improved mold release and minimized sticking, and rubber articles obtained therefrom.

BACKGROUND ART

Japanese Patent No. 2,990,646 (JP-A 8-199070) discloses a composition comprising a straight-chain fluoropolyether compound having at least two alkenyl groups in a molecule and a perfluoropolyether structure in the backbone, an organosilicon compound having at least two silicon-bonded hydrogen atoms in a molecule, and a hydrosilylation catalyst, which cures into parts having a good profile of heat resistance, chemical resistance, solvent resistance, water repellency, oil repellency, weather resistance and the like.

This fluoropolyether rubber composition can be readily formed into most shapes. In the case of complex shape parts or thin-wall parts like diaphragms, however, it is difficult to remove the molded composition from the mold because of tackiness. Since the difficulty of mold release leads to low production yields of molding step and an increased duration of molding cycle, there is a need for further improvement in processability.

If customarily used mold release agents of the internal addition type for rubber materials based on silicone oil and surfactant (known as internal mold release agents) are incorporated, they invite a rise of viscosity and a loss of fluidity, leading to molding difficulties.

SUMMARY OF THE INVENTION

An object of the invention is to provide curable fluoropolyether rubber compositions which when cured, exhibit good heat resistance, chemical resistance, solvent resistance, water repellency, oil repellency, and weather resistance as well as improved mold release property and minimized sticking. Another object is to provide rubber articles comprising the same.

It has been found that when an organosilicon compound having a silanol group in a molecule and a melting point of at least 60° C. is incorporated in a fluoropolyether rubber composition, the resulting composition undergoes little viscosity buildup and cures into products exhibiting improved mold release and minimized sticking while retaining good heat resistance, chemical resistance, solvent resistance, water repellency, oil repellency and other properties, and that rubber articles comprising the cured composition are suited for use in many applications including automobiles, chemical plants, semiconductor manufacture apparatus and the like.

In one aspect, the invention provides a curable fluoropolyether rubber composition comprising (A) a straight-chain fluoropolyether compound having at least two alkenyl groups in a molecule and a perfluoropolyether structure in the backbone, (B) an organosilicon compound having at least two silicon atom-bonded hydrogen atoms in a molecule, (C) an organosilicon compound having a silanol group in a molecule and a melting point of at least 60° C., and (D) a hydrosilylation catalyst.

In a second aspect, the present invention provides a rubber article comprising the curable fluoropolyether rubber composition in the cured state.

BENEFITS OF THE INVENTION

The curable fluoropolyether rubber composition of the invention is improved in mold release and molding efficiency, enabling the molding cycle to be completed within a short time and parts of complex shape to be molded in an effective way. Since molded parts themselves are little tacky, sticking is prohibited. Advantages of the curable fluoropolyether rubber composition include solvent resistance and chemical resistance because of a high fluorine content; low moisture permeability; smooth parting and water repellency because of low surface energy. Because of these features, the cured parts find a variety of applications, for example, as rubber materials for automobiles and aircraft, sealing materials for semiconductor manufacture apparatus, tent film materials, sealants, molded parts, extruded parts, coatings, copier roll materials, electrical moisture-proof coatings, sensor potting materials, release paper materials, and the like, and perform well even where acid resistance and oil resistance are required.

DESCRIPTION OF THE PREFERRED EMBODIMENT

Component (A) of the curable fluoropolyether rubber composition according to the invention is a straight-chain fluoropolyether compound having at least two alkenyl groups in a molecule and a perfluoropolyether structure in the backbone.

The preferred alkenyl groups in the straight-chain fluoropolyether compound are alkenyl groups of 2 to 8 carbon atoms having a $CH_2=CH-$ structure at an end such as vinyl, allyl, propenyl, isopropenyl, butenyl and hexenyl groups, with the vinyl and allyl being preferred. The alkenyl groups may be attached to the backbone of the straight-chain fluoropolyether compound at opposite ends either directly or through divalent linkages such as $-CH_2-$, $-CH_2O-$ or $-Y-NR^1-CO-$. Herein Y is $-CH_2-$ or

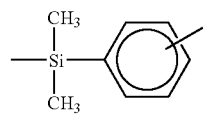

(inclusive of o-, m- and p-positions) and $R^1$ is hydrogen, methyl, phenyl or allyl. In component (A), at least two alkenyl groups must be contained per molecule.

The straight-chain fluoropolyether compound (A) has a perfluoropolyether structure in its backbone, which is described later.

One illustrative example of component (A) is a polyfluorodialkenyl compound having the following general formula (2).

$$CH_2=CH-(X)_a-Rf^1-(X')_a-CH=CH_2 \quad (2)$$

Herein X is $-CH_2-$, $-CH_2O-$, $-CH_2OCH_2-$ or $-Y-NR^1-CO-$ wherein Y is $-CH_2-$ or an o-, m- or p-dimethylsilylphenylene group of the following structural formula (Z):

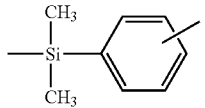

and $R^1$ is hydrogen or a substituted or unsubstituted monovalent hydrocarbon group, X' is —$CH_2$—, —$OCH_2$—, —$CH_2OCH_2$— or —CO—$NR^1$—Y'— wherein Y' is —$CH_2$— or an o-, m- or p-dimethylsilylphenylene group of the following structural formula (Z'):

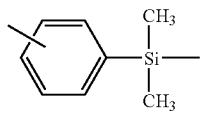

and $R^1$ is as defined above, $Rf^1$ is a divalent perfluoropolyether group, and "a" is independently 0 or 1.

In formula (2), $Rf^1$ is a divalent perfluoropolyether structure, preferably having the following general formula (i) or (ii).

           (i)

Herein, p and q each are an integer of 1 to 150, the sum of p+q is 2 to 200 on average, r is an integer of 0 to 6, and t is 2 or 3.

           (ii)

Herein, u is an integer of 1 to 200, v is an integer of 1 to 50, the sum of u+v is 10 to 250 on average, and t is as defined above.

Another illustrative example of component (A) is a polyfluoromonoalkenyl compound having the following general formula (3).

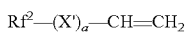           (3)

Herein X' and "a" are as defined above, $Rf^2$ is a group of the general formula (iii):

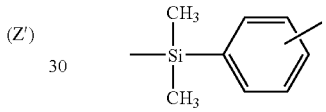           (iii)

wherein t is as defined above, and w is an integer of at least 1.

Preferred examples of component (A) are compounds having the following general formula (1). The invention favors use of a straight-chain fluoropolyether compound of formula (1) as component (A).

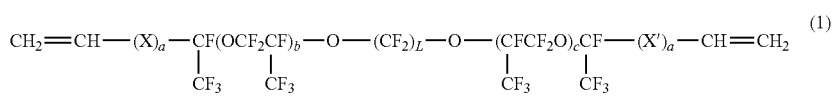           (1)

Herein X is —$CH_2$—, —$CH_2O$—, —$CH_2OCH_2$— or —Y—$NR^1$—CO— wherein Y is —$CH_2$— or a group of the following structural formula (Z):

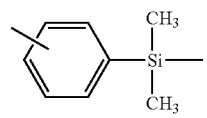           (Z)

(o-, m- or p-position), and $R^1$ is hydrogen, methyl, phenyl or allyl,

X' is —$CH_2$—, —$OCH_2$—, —$CH_2OCH_2$— or —CO—$NR^1$—Y'— wherein Y' is —$CH_2$— or a group of the following structural formula (Z'):

           (Z')

(o-, m- or p-position), and $R^1$ is as defined above,

"a" is independently 0 or 1, L is an integer of 2 to 6, and b and c each are an integer of 0 to 200.

Component (B) is an organosilicon compound having at least two silicon atom-bonded hydrogen atoms (i.e., SiH groups) in a molecule. It serves as a crosslinking agent and chain extender for component (A). When compatibility with and dispersion in component (A) and uniformity after curing are taken into account, the organosilicon compound should preferably have at least one fluorinated group in a molecule.

Suitable fluorinated groups include those of the following general formulae.

$C_gF_{2g+1}$—

—$C_gF_{2g}$—

Letter g is an integer of 1 to 20, preferably 2 to 10.

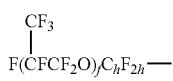
Letter f is an integer of 2 to 200, preferably 2 to 100, and h is an integer of 1 to 3.
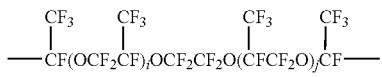
Letters i and j each are an integer of at least 1, and an average of i+j is from 2 to 200, preferably from 2 to 100.
Examples of the organosilicon compounds having such fluorinated groups are shown below. Note that Me is methyl and Ph is phenyl.
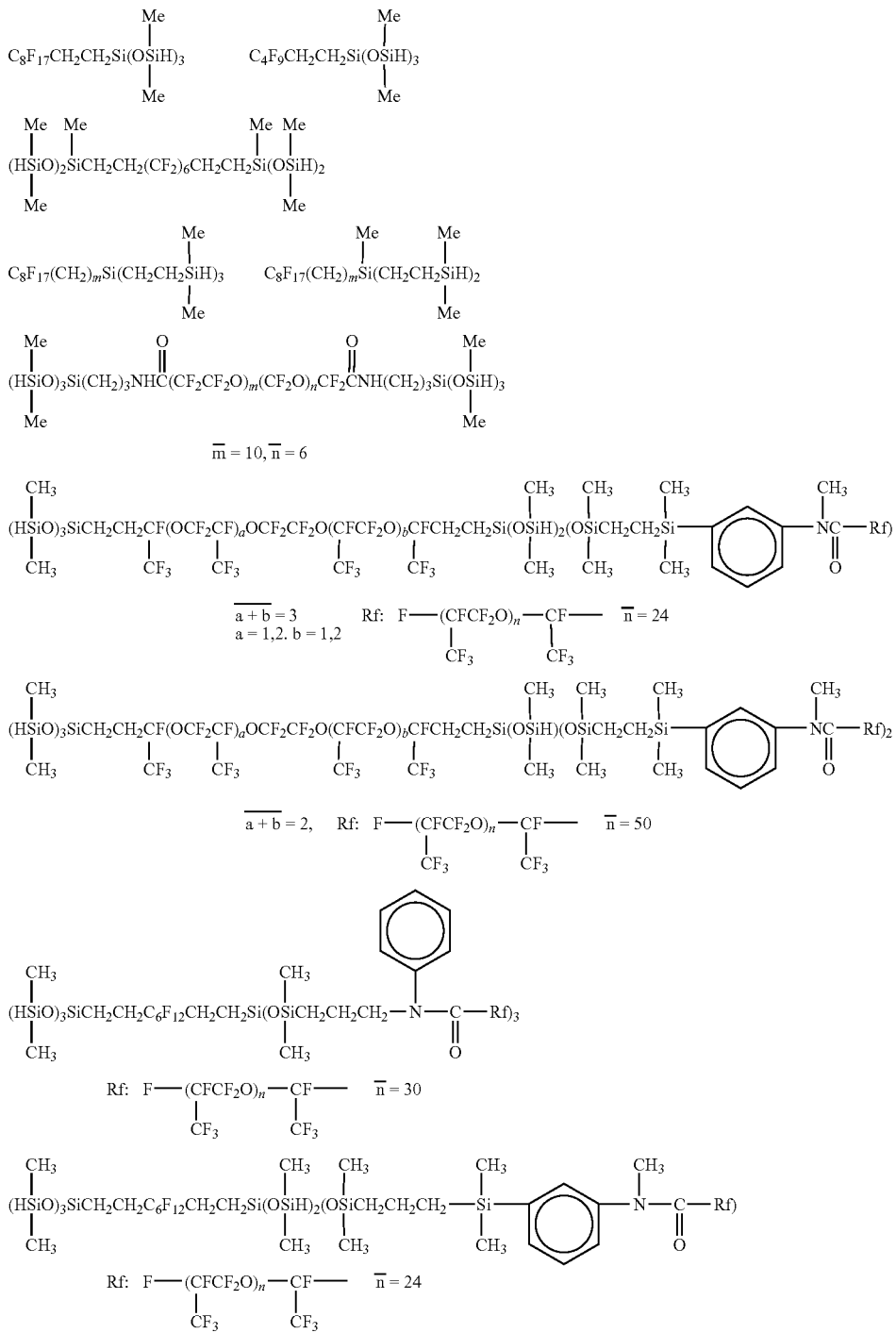

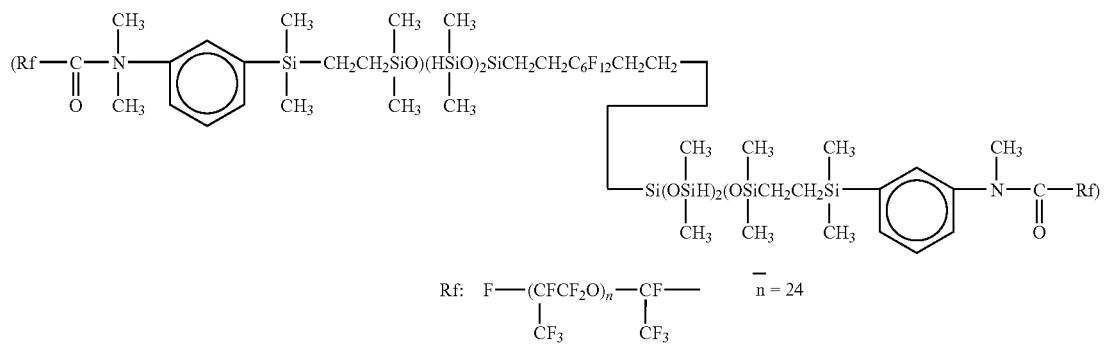
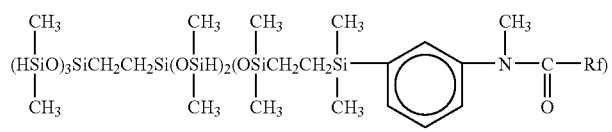
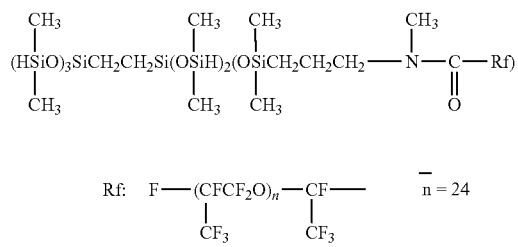
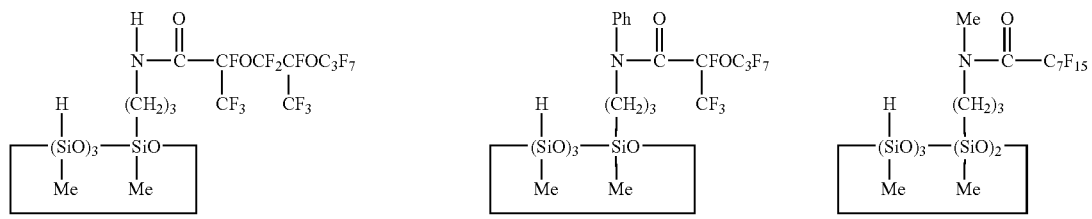
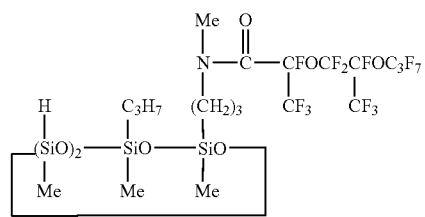
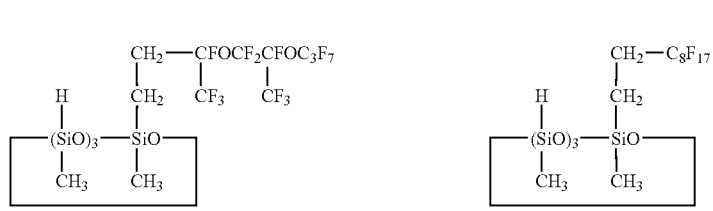
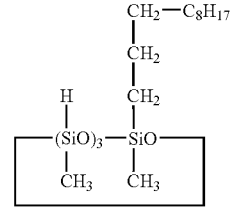

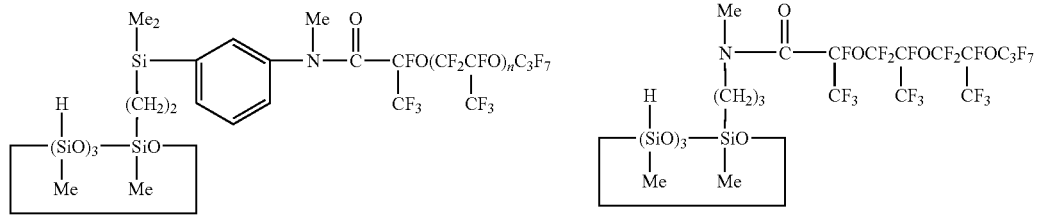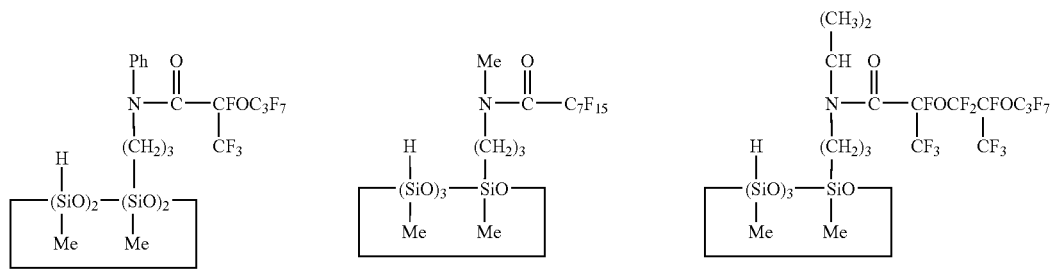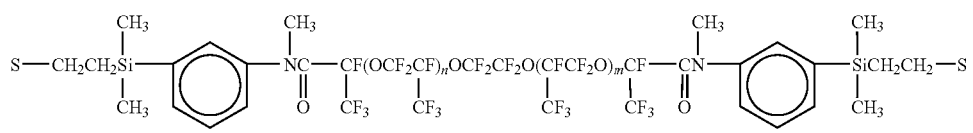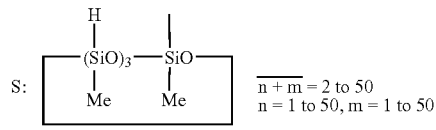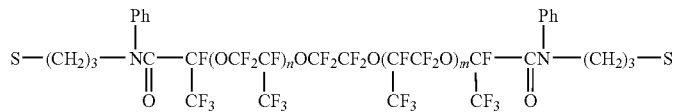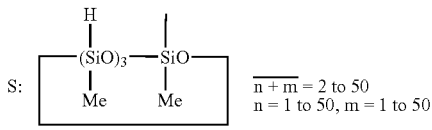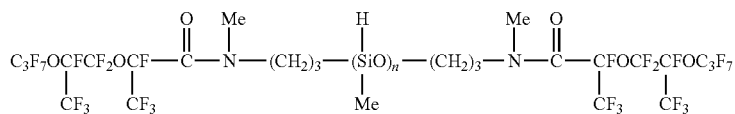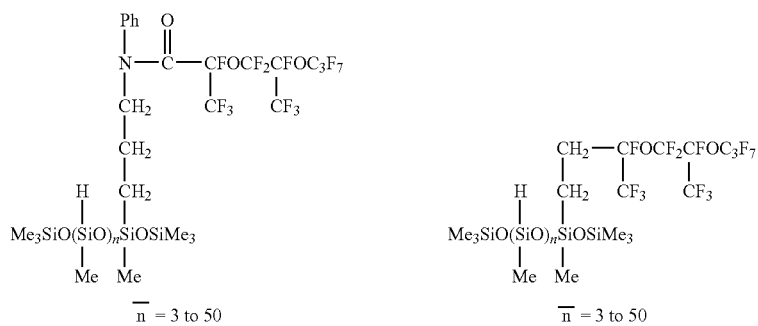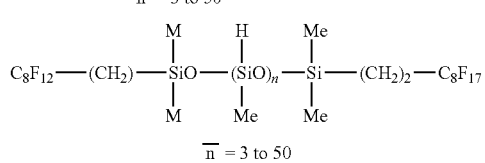

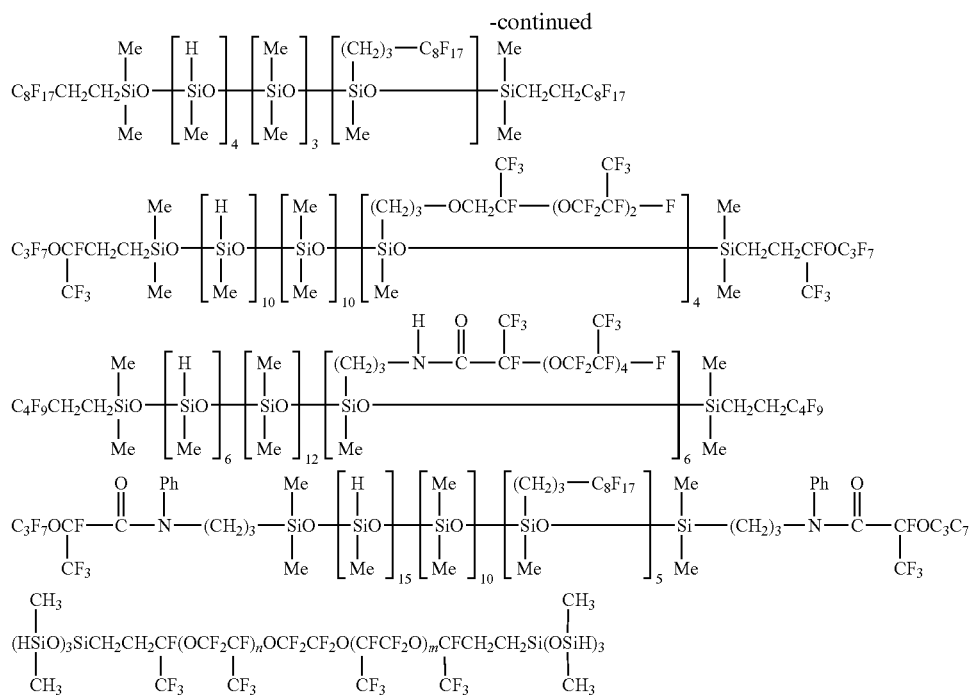

n = 1 to 50, m = 1 to 50, n + m = 2 to 50

These organosilicon compounds may be used alone or in admixture of two or more.

Component (B) is blended in an effective amount to cure component (A). Most often, component (B) having hydrosilyl (or SiH) groups is blended in such an amount as to provide 0.5 to 5 moles, and more preferably 1 to 2 moles of SiH groups per mole of alkenyl groups (e.g., vinyl, allyl or cycloalkenyl) in component (A). Outside the range, less amounts of component (B) may achieve an insufficient degree of crosslinking; and excessive amounts of component (B) may allow chain lengthening to become preferential, inviting under-curing, foaming, and degradation of heat resistance and compression set.

Component (C) is an organosilicon compound having a silanol group in a molecule and a melting point of at least 60° C. It serves as an internal mold release agent for imparting mold release and low sticking properties.

If customary liquid internal mold release agents are added to a polymer component, the compositions become thickened because most mold release agents are incompatible with the polymer component. Such a viscosity buildup is detrimental to workability like liquid injection molding system (LIMS) workability. So this approach is impractical. Additionally, some liquid internal mold release agents will separate from the compositions during shelf storage.

In this sense, it is crucial that the internal mold release agent (C) be solid during storage at room temperature. Specifically, shelf stability requires the agent to have a melting point of at least 60° C. and preferably in the range of 80 to 160° C.

In addition, the compound (C) should have at least one silanol group, preferably two silanol groups, in a molecule. The silanol group is necessary in order that the compound (C) bleed out on the surface of the cured composition when the composition is heated above the melting point of the compound (C) during the curing or post-curing step.

Typical of the solid organosilicon compound having at least one silanol group in a molecule and a melting point of at least 60° C. are compounds having the general formulae (I) and (II).

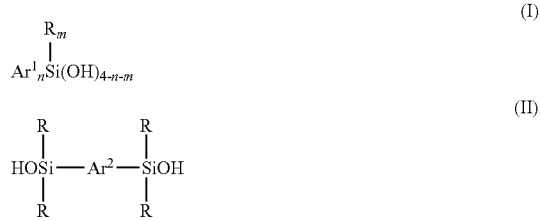

In formulae (I) and (II), $Ar^1$ is a substituted or unsubstituted, monovalent aromatic hydrocarbon group of 6 to 12 carbon atoms, $Ar^2$ is a substituted or unsubstituted, divalent aromatic hydrocarbon group of 6 to 12 carbon atoms, R is a substituted or unsubstituted, monovalent hydrocarbon group of 1 to 10 carbon atoms, m is 0, 1 or 2, and n is 1, 2 or 3, satisfying $1 \leq m+n \leq 3$.

Illustrative examples of the compounds having formulae (I) and (II) are given below. Me is methyl.

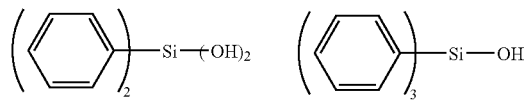

-continued

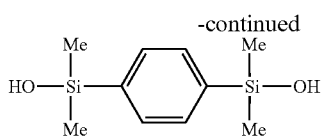

Preferably 0.1 to 20 parts by weight of component (C) is added to 100 parts by weight of component (A). The amount of component (C) added is more preferably 0.3 to 5.0 parts by weight when a balance of mold release and mechanical properties and stability are taken into account. Mold release may not be expected at less than 0.1 part of component (C) whereas more than 20 parts of component (C) may sometimes degrade mechanical properties.

Component (D) is a hydrosilylation catalyst for promoting the addition reaction between alkenyl groups in component (A) and hydrosilyl groups in component (B). The hydrosilylation catalyst is often selected from noble metal compounds which are expensive. Platinum and platinum compounds are thus used because they are readily available.

Exemplary platinum compounds are chloroplatinic acid, complexes of chloroplatinic acid with olefins such as ethylene, complexes of chloroplatinic acid with alcohols and vinylsiloxanes, and metallic platinum supported on silica, alumina or carbon, though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph denotes phenyl.

The hydrosilylation catalyst may be used in a catalytic amount. It is preferably added in an amount to give 0.1 to 100 parts by weight of platinum group metal per million parts by weight of components (A), (B) and (C) combined.

In addition to the foregoing components (A) to (D), fillers, typically reinforcing fillers may be added to the inventive composition for improving mechanical strength. Reinforcing fillers are added for the purposes of improving mechanical strength, thermal stability, weather resistance, chemical resistance and/or flame retardance, reducing thermal shrinkage upon curing, reducing the coefficient of thermal expansion of the cured elastomer, and/or lowering the gas permeability. The major purpose is to improve mechanical strength.

Exemplary fillers include fumed silica, wet silica, ground silica, calcium carbonate, diatomaceous earth, carbon black and various metal oxide powders, which may be treated with surface treating agents, if desired. Among others, fumed silica is preferred from the standpoint of improving mechanical strength. Fumed silica treated with a silane base surface treating agent is especially preferred because it is effectively dispersible.

The filler is preferably added in an amount of 5 to 200 parts by weight per 100 parts by weight of component (A). The amount of the filler preferred for the stability of mechanical properties is 10 to 60 parts by weight.

If desired, pigments, dyes and the like may be compounded in the curable fluoropolyether rubber composition of the invention. Insofar as the benefits of the invention are not impaired, various additives may be added to the inventive composition. Such optional additives include inhibitors of the hydrosilylation catalyst, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutenol; 3-methyl-3-penten-1-yne, 3,5-dimethyl-3-hexen-1-yne, and the like; polymethylvinylsiloxane cyclic compounds; and organophosphorus compounds. Incorporation of such an inhibitor leads to a compromise between cure reactivity and storage stability.

The method of preparing the curable fluoropolyether rubber composition of the invention is not critical. The composition may be formulated as a single composition by combining all the essential components. Alternatively, the rubber composition is formulated into two packs where the two packs are mixed together on use.

Cured parts can be formed by prior art known techniques, for example, by feeding the inventive composition into a suitable mold and causing the composition to cure therein, or by applying the inventive composition onto a suitable substrate and causing the coating to cure. Often, the composition is cured simply by heating at a temperature of about 100 to 180° C. for about 10 seconds to about 30 minutes.

The fluoropolyether rubber composition of the invention in the cured state has good heat resistance, chemical resistance, solvent resistance, water repellency, oil repellency, weather resistance and the like. In addition, the molded (or cured) parts have satisfactory compression set and smooth parting properties, especially smooth mold release properties. Because of these features, the cured parts find a variety of applications.

Rubber articles using the cured composition of the invention are suitable for use in automobiles, chemical plants, ink jet printers, semiconductor manufacturing lines, analytical or scientific instruments, medical equipment, aircraft or fuel cells and as rubber parts such as diaphragms, valves, O-rings, oil seals, gaskets, packings, joints and face seals.

More illustratively, rubber articles comprising the cured composition of the invention are used as rubber parts for automobiles, rubber parts for chemical plants, rubber parts for ink jet printers, rubber parts for semiconductor manufacturing lines, rubber parts for analytical or scientific instruments, rubber parts for medical equipment, and rubber parts for aircraft, as well as tent film materials, sealants, molded parts, extruded parts, coatings, copier roll materials, electrical moisture-proof coatings, sensor potting materials, fuel cell seals, laminate rubber fabrics, and release paper materials.

Rubber articles made of the cured composition of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints; and rubber parts for aircraft, for example, O-rings, face seals, packings, gaskets, diaphragms, and valves in fluid piping for engine oil, jet fuel, hydraulic oil and Skydrol®.

EXAMPLE

Examples of the invention are given below by way of illustration and not by way of limitation. All parts are by weight.

Preparation of a base compound and evaluation of rubber physical properties of cured compositions are described below.

Preparation of Base Compound

To 100 parts of a polymer of the formula (4) shown below (viscosity 8,300 cs, weight average molecular weight 22,000, vinyl content 0.009 mole/100 g) was added 25 parts of fumed silica treated with dimethylsiloxy groups and having a specific surface area of 200 m²/g. They were mixed, heat treated and milled on a three-roll mill. To the mixture were added 2.74 parts of a fluorinated organosilicon compound of the formula (5) shown below, 0.2 part of a toluene solution of a catalyst in the form of chloroplatinic acid modified with a compound of the formula (6) shown below (platinum concentration 0.5 wt %) and 0.4 part of a fluorine-modified acetylene alcohol. They were mixed to form a base compound.

Mold Release

A rubber composition was molded under the same conditions as above except that a mold having six O-ring-forming cavities of JIS P-8 size (whose surface was chromium plated) was used. By examining how O-rings were removed from the mold, mold release was evaluated according to the following criterion.

⊙: very smooth
○: smooth
Δ: fairly smooth
×: difficult

Peeling Force

A rubber composition was molded integrally with a chromium-plated plate (25×100×0.3 mm) under the same conditions as in the measurement of rubber physical properties. The force needed to peel the rubber coating from the plate at an angle of 180° was measured by a strograph E-L (Toyo Seiki Co., Ltd.).

Compression Set

A rubber composition was cast into an O-ring mold having an inner diameter of 25.0 mm and a ring cross-section diameter of 3.50 mm, press-cured at 150° C. for 10 minutes, and post-cured at 200° C. for 4 hours. The O-ring thus obtained was used as a test specimen. The specimen was held by a mold jig, compressed 25% at 200° C. for 24 hours, cooled to room

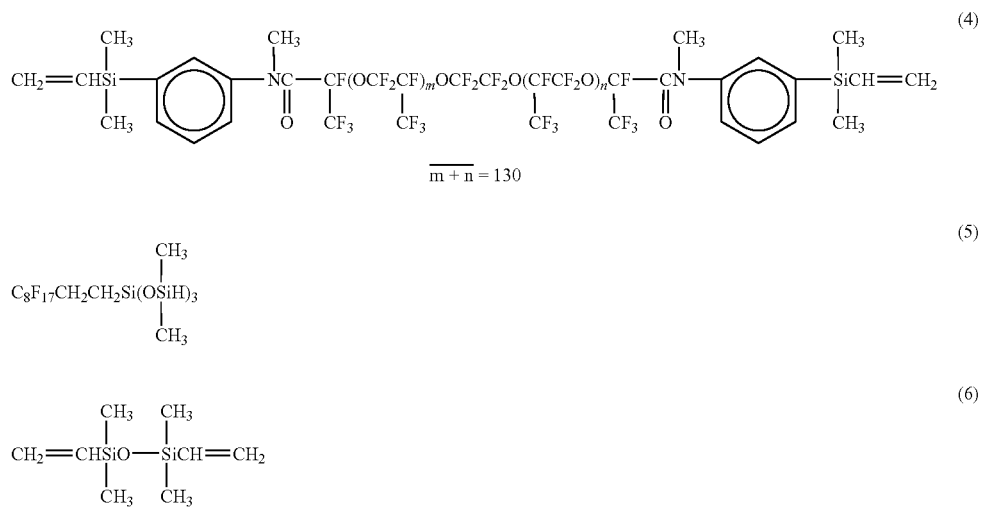

Rubber Physical Properties

A rubber composition was deaerated in vacuum, cast into a rectangular frame of 2 mm thick, deaerated again, press-cured at 100 kg/cm² and 150° C. for 10 minutes, and post-cured at 200° C. for 4 hours. A test specimen was cut from the cured sample and measured for hardness, elongation, tensile strength and tear strength according to JIS K6251; K6252 and K6253. Note that tear strength was measured on crescent shaped specimens. Also the viscosity of a rubber composition was measured prior to cure according to JIS K7117.

temperature, and released from the jig. From the thickness values of the specimen before and after the compression, a compression set was computed.

Examples 1-5 & Comparative Example 1

To the base compound, diphenylsilane diol (Additive A), triphenylsilanol (Additive B), or 1,4-bis(hydroxydimethylsilyl)benzene (Additive C), identified below, was added in the amount shown in Table 1. They were dispersed on a three-roll mill to form a rubber composition, after which the rubber physical properties, mold release, peeling force and compression set were determined as above.

TABLE 1

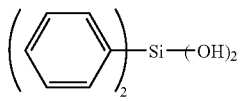
Additive A (m.p. 138-140° C.)

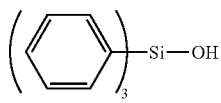
Additive B (m.p. 153-154° C.)

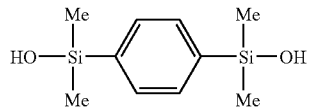
Additive C (m.p. 135-137° C.)
(Me: methyl)

| Formulation (pbw) | Example | | | | | Comparative Example |
|---|---|---|---|---|---|---|
|  | 1 | 2 | 3 | 4 | 5 | 1 |
| Base compound | 100 | 100 | 100 | 100 | 100 | 100 |
| Additive A | 0.5 | 1 |  |  |  |  |
| Additive B |  |  | 0.5 | 1 |  |  |
| Additive C |  |  |  |  | 1 |  |
| Properties |  |  |  |  |  |  |
| Viscosity (Pa · s) | 884 | 910 | 866 | 888 | 894 | 858 |
| Hardness (Durometer A) | 53 | 54 | 53 | 54 | 53 | 53 |
| Elongation (%) | 510 | 490 | 520 | 500 | 520 | 500 |
| Tensile strength (MPa) | 9.7 | 9.5 | 9.9 | 10.1 | 9.6 | 10.4 |
| Tear strength (kN/m) | 32 | 34 | 34 | 34 | 32 | 35 |
| Mold release | ○ | ◎ | ◎ | ◎ | ◎ | X |
| Peeling force (kgf/25 mm) | 0.3 | 0.1 | 0.2 | 0.1 | 0.2 | 1.6 |
| Compression set @ 200° C./24 hr/25% compression (%) | 18 | 20 | 19 | 18 | 20 | 18 |

As compared with Comparative Example 1 having no additive added, the compositions of Examples are significantly improved in mold release and peeling force, and approximately equal in viscosity, rubber physical properties and compression set. It is demonstrated that the addition of the specific internal mold release agents improves the mold release and peeling force of the composition without detracting from physical properties.

Japanese Patent Application No. 2005-123838 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable fluoropolyether rubber composition comprising
(A) a straight-chain fluoropolyether compound having at least two alkenyl groups in a molecule and a perfluoropolyether structure in the backbone,
(B) an organosilicon compound having at least two silicon atom-bonded hydrogen atoms in a molecule,
(C) an organosilicon compound having a silanol group in a molecule and a melting point of at least 60° C., wherein said organosilicon compound has the formula (I) or (II):

in which $Ar^1$ is a substituted or unsubstituted, monovalent aromatic hydrocarbon group of 6 to 12 carbon atoms, $Ar^2$ is a substituted or unsubstituted, divalent aromatic hydrocarbon group of 6 to 12 carbon atoms, R is a substituted or unsubstituted, monovalent hydrocarbon group of 1 to 10 carbon atoms, m is 0, 1 or 2, n is 1, 2 or 3, and the sum of m+n is from 1 to 3, and (D) a hydrosilylation catalyst.

2. The composition of claim 1 wherein component (A) is a straight-chain fluoropolyether compound of the following general formula (1):

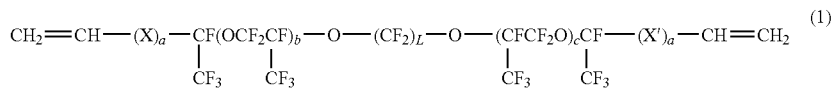

wherein X is —$CH_2$—, —$CH_2O$—, —$CH_2OCH_2$— or —Y—$NR^1$—CO— wherein Y is —$CH_2$— or a group of the following structural formula (Z):

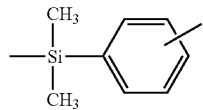

(o-, m- or p-position) and $R^1$ is hydrogen, methyl, phenyl or allyl, X' is —$CH_2$—, —$OCH_2$—, —$CH_2OCH_2$— or —CO—$NR^1$—Y'— wherein Y' is —$CH_2$— or a group of the following structural formula (Z'):

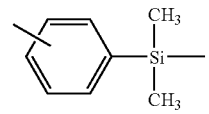

(o-, m- or p-position) and $R^1$ is as defined above, "a" is independently 0 or 1, L is an integer of 2 to 6, and b and c each are an integer of 0 to 200.

* * * * *